United States Patent [19]
Lingenfelter et al.

[11] Patent Number: 5,958,267
[45] Date of Patent: Sep. 28, 1999

[54] HIGH PRESSURE LASER WELDING OF NUCLEAR FUEL RODS

[75] Inventors: Andrew A. Lingenfelter; James M. Gehr, both of Wilmington; Johnny R. Skipper, Leland; Robert J. Sziemkiewicz, Wilmington; Jeffrey P. Johnson, Castle Hayne; Robert A. Haughton, Wilmington; Harry L. Batson, Winnabow; Jaime A. Zuloaga, Jr., Wilmington; Michael T. Kiernan, Wilmington; John L. Harmon, Wilmington; Edward G. Apple, Jr., Wilmington, all of N.C.

[73] Assignee: General Electric Company, Schenectady, N.Y.

[21] Appl. No.: 08/897,142

[22] Filed: Jul. 21, 1997

[51] Int. Cl.$^6$ .................................................... B23K 26/12
[52] U.S. Cl. .............................. 219/121.63; 219/121.64; 219/121.84; 219/121.86
[58] Field of Search .................. 219/121.63, 121.64, 219/121.81, 121.82, 121.83, 121.84, 121.85, 121.86

[56] References Cited

U.S. PATENT DOCUMENTS

| | | | |
|---|---|---|---|
| 3,774,010 | 11/1973 | Heer et al. ......................... | 219/121.85 |
| 4,414,460 | 11/1983 | Sudo et al. ......................... | 219/121.64 |
| 4,857,260 | 8/1989 | Schoenig, Jr. et al. . | |
| 5,026,967 | 6/1991 | Bell et al. ......................... | 219/121.64 |
| 5,041,715 | 8/1991 | Muller ................................ | 219/121.64 |
| 5,194,712 | 3/1993 | Jones .................................. | 219/121.67 |
| 5,231,261 | 7/1993 | Duthoo . | |
| 5,245,640 | 9/1993 | Lingenfelter et al. . | |

FOREIGN PATENT DOCUMENTS

| | | | |
|---|---|---|---|
| 54-99750 | 8/1979 | Japan .............................. | 219/121.63 |
| 60-115391 | 6/1985 | Japan .............................. | 219/121.64 |
| 63-79098 | 4/1988 | Japan .............................. | 219/121.64 |
| 63-286797 | 11/1988 | Japan .............................. | 219/121.63 |
| 1-245977 | 10/1989 | Japan .............................. | 219/121.63 |
| 1497486 | 1/1978 | United Kingdom ............. | 219/121.64 |

OTHER PUBLICATIONS

King, "Pressurization of nuclear fuel rods using laser welding," SPIE vol. 247, pp. 24–29, 1980.

*Primary Examiner*—Gregory Mills
*Attorney, Agent, or Firm*—Nixon & Vanderhye PC

[57] ABSTRACT

A high pressure laser welding method and apparatus enables seam welding of a nuclear fuel rod at hyperbaric pressure. In an automatic process, a loaded fuel rod and an upper end plug are mated within a sealable weld box. A pressure within the weld box is controlled relative to a pressure within the fuel rod, and a laser assembly welds the seam at hyperbaric pressure. Helium flowing through a laser window nozzle during welding prevents soot contamination of the laser window glass and prevents formation of ionic plasma. The upper end plug fuel rod welding operation is thus reduced to a single step and eliminates inspection related tasks with respect to a sealed hole.

21 Claims, 2 Drawing Sheets

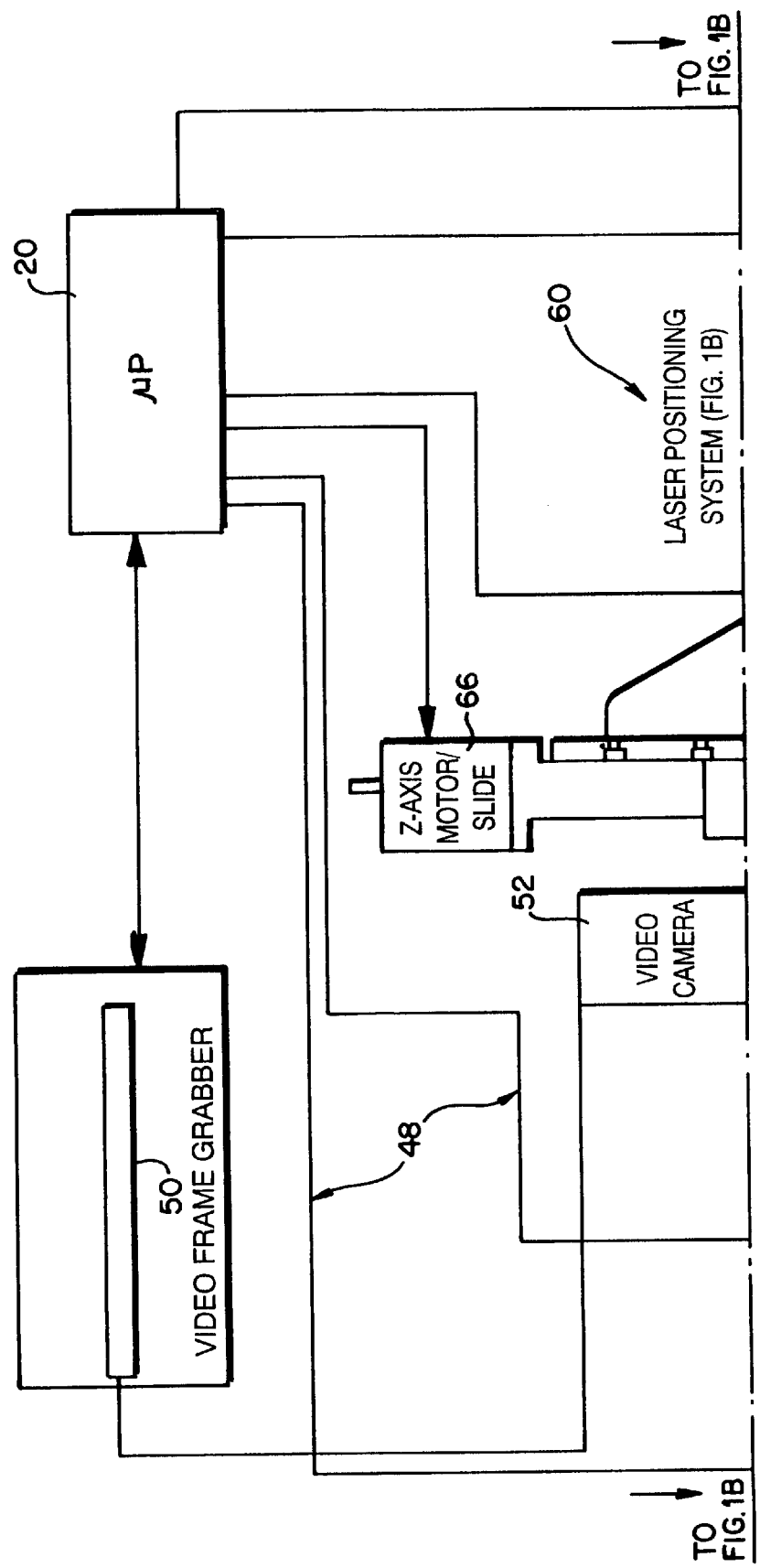

HIGH PRESSURE LASER WELDING OF NUCLEAR FUEL RODS

TECHNICAL FIELD

The present invention relates to automated welding and inspection of end plugs to cladding welds for nuclear fuel rods and, in particular, to automated welding and inspection at atmospheric or hyperbaric pressure in an inert gas environment.

BACKGROUND

A fuel rod for a nuclear reactor fuel bundle includes a fuel tube formed of a zirconium alloy that houses a plurality of uranium fuel pellets. The fuel tube is sealed by upper and lower end plugs welded at ends thereof. In the manufacturing process, the lower end plug is first welded to the fuel tube. The uranium fuel pellets, with varying enrichments, are loaded into the fuel tube, and a plenum spring is inserted on top of the fuel column. The fuel tube is pressurized to a specified internal pressure, and an upper end plug is welded onto the open end of the fuel tube.

The internal fuel rod gas is typically hyperbaric helium to increase the heat transfer performance of the rod in the reactor. This requires the final (upper end plug) weld to be made under hyperbaric helium conditions. The tungsten-inert gas (TIG) weld process is normally used for fuel rod welding; however, TIG weld arcs are unstable and difficult to control in a hyperbaric helium environment.

In the conventional process, the upper end plug is welded to the fuel cladding (seam weld) in one atmosphere of helium, and the fuel rod is then pressurized to the helium design pressure through a small pressurization hole in the upper end plug. Once a stable helium environment is obtained, the pressurization hole is spot welded closed using a TIG weld process (seal weld). The welding of the pressurization hole is of such short duration and simplicity that the high pressure TIG instability has little or no negative consequence.

Although this approach solves the arc instability of the TIG process in hyperbaric helium, the final end plug design is more complex and costly to develop. The process also requires additional inspections, first to assure that the pressurization hole is open and accurately dimensioned to allow sufficient gas flow, and second to assure that the spot weld closed the pressurization hole and provided sufficient-weld thickness to withstand in-reactor operating conditions.

Furthermore, the use of tungsten electrodes risks the possibility of tungsten contamination of the welds. This problem potentially can occur on both the first (lower end plug) and final (upper end plug) weld. Sufficient levels of tungsten contamination in the weld joint can cause chemical corrosion of the weld in the reactor, resulting in a failed fuel rod and costly operating procedures.

Attempts have been made to utilize laser seam welding in an effort to obviate the drawbacks associated with the two-step TIG weld process. In the previous laser seam welding process, welding was attempted with a $CO_2$ laser at hyperbaric pressure. The process, however, suffered numerous drawbacks, which rendered the process commercially unacceptable. In particular, soot evolved during the welding process that occluded the optics and caused absorption of the laser beam, cracking the optics. Moreover, the welding process was comprised of a pulsed mode seam weld followed by a continuous wave (CW) resurface weld. The pulsed mode welding created the fuel rod cladding to end plug joint. The CW mode resurface welds smoothed the surface of the weld to allow for automatic ultrasonic (compression wave) inspection for weld integrity. During the beam mode change from pulsed to CW, the focal length of the $CO_2$ laser was not consistent and required constant attention to achieve acceptable process yields. In addition, ionic plasma formed over the weld joints and was suspected of causing laser beam reflections back up into the optics train, which had potentially damaging effects.

DISCLOSURE OF THE INVENTION

In accordance with the present invention, an apparatus and method is provided for performing laser seam welding of fuel rod end plugs at hyperbaric pressure. Performing the seam weld at hyperbaric pressure eliminates the need for the seal weld and reduces upper end plug fuel rod welding to a one-step operation. The one-step welding process also eliminates the need for inspection of the upper end plug prior to use to ensure that the seal hole is open and also eliminates the need for radiographic or ultrasonic inspection of the seal weld joint. Welding with a laser also eliminates the potential in-reactor corrosion failure caused by TIG welding electrode contamination of the weld pool.

In an exemplary embodiment according to the invention, there is provided a high pressure laser welding method including (a) securing an article to be welded inside a weld box, (b) pressurizing the weld box, (c) directing a laser such as a yttrium aluminum garnet (YAG) laser or a neodymium YAG laser toward the article to be welded along a laser axis, and (d) flowing gas along the laser axis at a predetermined axial flow rate. Step (d) is preferably practiced by flowing gas at an axial flow rate that prevents formation of ionic plasma and prevents soot generated at the weld joint from backflow. The pressure in the weld box may be varied during welding.

In accordance with another exemplary aspect of the invention, there is provided a laser welding apparatus for welding articles together that includes an article positioning assembly supporting and positioning the articles to be welded together, a sealable weld box cooperating with the article positioning assembly, a pressurized gas source communicating with the weld box, a laser assembly that generates a welding laser directed into the weld box, and a controller operatively coupled with the article positioning assembly, the pressurized gas source, and the laser assembly. The controller controls a position of the articles to be welded together, a pressure in the weld box, and operation of the laser in accordance with predetermined parameters. The controller preferably includes an image processor having a video frame grabber coupled with a video camera focused in the weld box.

In preferred applications, the articles to be welded together comprise a fuel rod for a nuclear reactor fuel bundle and an end plug. In this regard, the article positioning assembly includes a fuel rod collet supporting the fuel rod and controlling the position of the fuel rod in the weld box, and an end plug supporting assembly including an end plug adapter supporting the end plug and an end plug ram controlling a position of the end plug adapter. The article positioning assembly may further include a retractable fuel rod stop disposed in the weld box, which in an extended position receives an end of the fuel rod. The article positioning assembly may still further include a fuel rod inflating seal that seals the fuel rod outside diameter. The weld box preferably includes a fuel rod opening for receiving the fuel rod inflating rod seal and the fuel rod and an end plug opening for receiving the end plug adapter and the end plug. The fuel rod opening is sealed when the fuel rod inflating rod seal and the fuel rod are received therein, and the end plug opening is sealed when the end plug adapter and the end plug are received therein.

The end plug supporting assembly preferably further includes a ram brake coupled with the end plug ram and the end plug adapter, which locks the position of the end plug adapter during welding. A laser window nozzle may be provided secured to the weld box and coupled with the pressurized gas source. A laser positioning system communicates with the controller, wherein the controller controls a position of the laser assembly in accordance with a signal from the image processor. The laser assembly is preferably positioned offset longitudinally along the weld to prevent laser reflection. The fuel rod collet is preferably rotatable for rotating the fuel rod during welding, wherein the controller controls the rotation of the fuel rod. The weld box also includes an evacuation port that enables soot generated during welding to be evacuated from the weld box.

In accordance with still another exemplary aspect according to the invention, there is provided a method of welding an end plug to a fuel rod for a nuclear reactor fuel bundle. The method includes (a) supporting the fuel rod and the end plug in a weld box, (b) pressurizing the weld box and the interior of the fuel rod to a first pressure, (c) directing a laser toward the fuel rod and the end plugs for welding along a laser axis, and (d) flowing gas along the laser axis at a predetermined axial flow rate.

After step (b), the method may include the step of inserting the end plug into the fuel rod to seal the fuel rod and overpressurizing the weld box to a second pressure such that the weld box pressure is higher than the fuel rod interior pressure. The method may still further include, prior to step (c), the step of capturing an image of a joint between the fuel rod and the end plug with an image processor and positioning the laser in accordance with a signal from the image processor. Prior to step (c), the fuel rod is rotated. Another step of the method may include evacuating soot evolved from the welding processes out of the weld box via an evacuation port.

BRIEF DESCRIPTION OF THE DRAWINGS

These and other aspects and advantages of the present invention will be described in detail with reference to the accompanying drawings, in which:

FIGS. 1A and 1B illustrate the laser welding apparatus according to the present invention.

BEST MODE FOR CARRYING OUT THE INVENTION

Figure 1B:
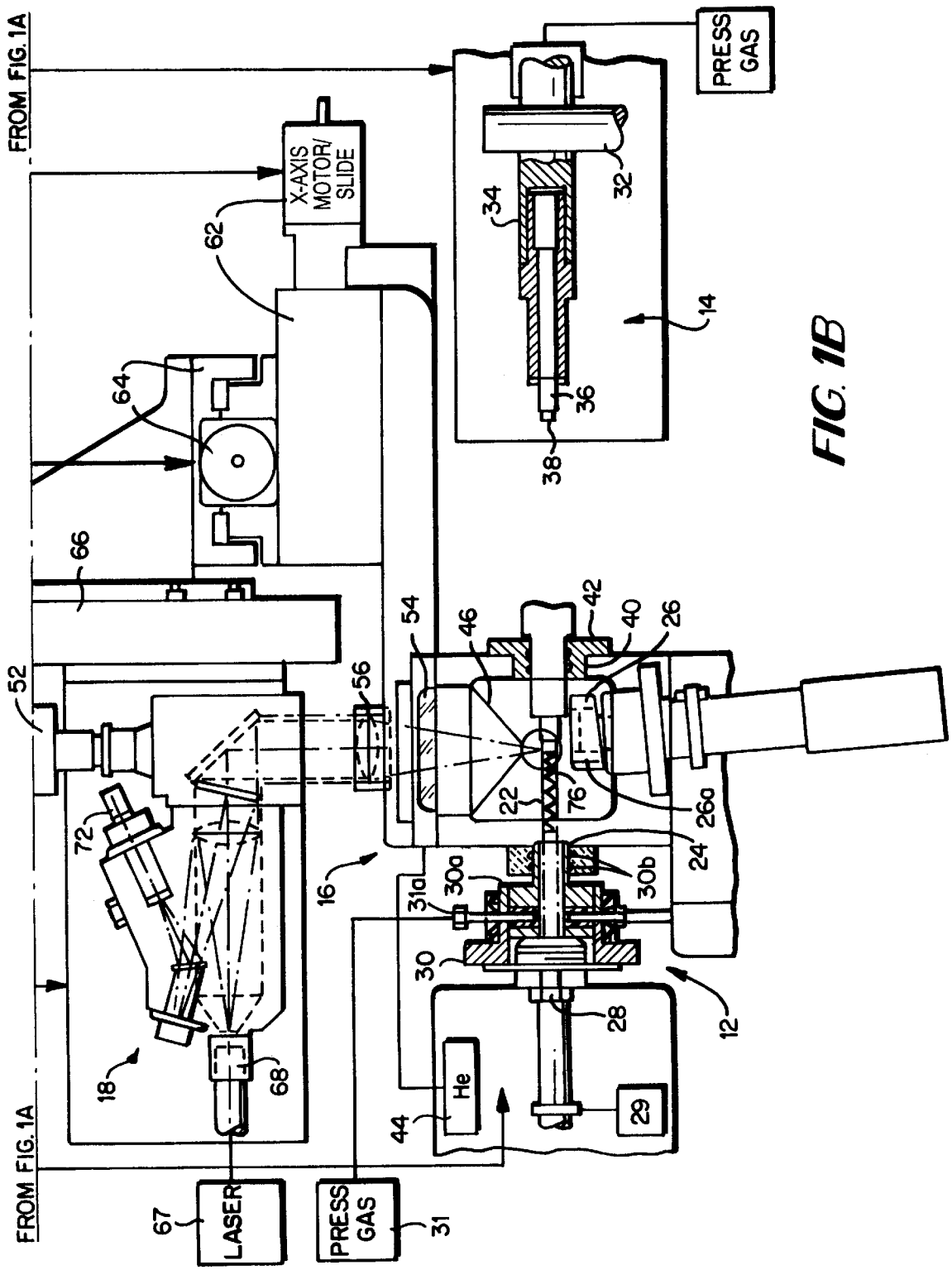

In accordance with the present invention, an apparatus and method are provided for high-pressure laser welding particularly of end plugs and fuel rod tubes for a nuclear reactor fuel bundle. Although the apparatus and method described are particularly suited for high pressure laser welding of nuclear fuel rods, the invention is not meant to be so limited. Those of ordinary skill in the art will contemplate alternative applications of the welding apparatus and method. The description utilizing fuel rods and end plugs for a nuclear reactor fuel bundle is thus only one exemplary application of the concepts according to the invention.

Referring to FIGS. 1A and 1B, the laser welding apparatus according to the invention includes an article positioning assembly 12, 14 that supports and positions the articles to be welded together, a sealable weld box 16 cooperating with the article positioning assembly 12, 14, in which high-pressure welding of the articles is carried out, a laser assembly 18 that generates a welding laser such as a YAG laser or a neodymium YAG laser directed into the weld box 16, and a controller 20 that controls each aspect of the welding operation.

The article positioning assembly 12, 14 includes a fuel rod supporting and positioning side designated by reference numeral 12 and an end plug supporting and positioning side designated by reference numeral 14. The apparatus and method of the invention are particularly suited for the final weld of the upper end plug to the fuel rod. Thus, the fuel rod being welded has the lower end plug welded thereto and has been loaded with uranium fuel pellets with varying enrichments. A plenum spring has also been inserted on top of the fuel column.

The loaded fuel rod 22 is placed inside the weld box 16 through a fuel rod opening 24 in the weld box and against a fuel rod stop 26. The fuel rod stop is displaceable between a retracted position as shown in FIGS. 1A and 1B and an extendable position in the path of the fuel rod substantially aligned with the fuel rod opening 24. The fuel rod stop 26 has a tapered lead in section 26a to facilitate insertion of the fuel rod 22. Once the fuel rod has engaged the fuel rod stop 26, a fuel rod collet 28 of conventional structure is secured onto the fuel rod outside diameter holding the fuel rod 22 in position against the fuel rod stop 26. A driving unit 29 of any suitable structure such as a drive motor and pulley arrangement is coupled with the collet for rotating the collet and fuel rod in operation.

After the fuel rod stop 26 is retracted, a fuel rod inflating seal 30 is inflated forming a seal against the fuel rod outside diameter. The seal 30 includes, for example, a polyurethane or like material seal 30a that is inflated over the fuel rod cladding. A source of pressurized gas 31 such as air communicates with the seal via an inlet 31a. The seal 30 is also provided with O-rings 30b disposed in the fuel rod opening 24. By virtue of this triple redundancy sealing including the inflatable polyurethane seal 30a and two O-rings 30b, the fuel rod side of the weld box can be securely sealed during operation.

The end plug section 14 of the article positioning assembly 12, 14 includes a ram brake 32 cooperating with a pneumatic ram 34, which supports an end plug adapter 36. The end plug 38 to be welded to the fuel rod 22 is supported in the end plug adapter 36. In operation, the end plug ram 34 is extended to a first position along with the end plug adapter 36 containing the end plug 38 until the ram 34 is inserted through an end plug opening 40 in the weld box. The end plug opening 40 includes an O-ring seal assembly 42 such that when the end plug adapter 36 is inserted through the end plug opening 40, the weld box 16 is then completely sealed and ready for pressurization.

In this state, the fuel rod 22 and end plug 38 are positioned for engagement, but are not yet engaged, and the fuel rod interior is exposed. The weld box, however, is sealed from the atmosphere. The weld box 16 and fuel rod 22 are then pressurized with a gas such as helium via a pressurized source 44. The helium is directed through a conically shaped laser window nozzle 46. Pressurization is complete when the helium pressure reaches a predetermined fuel rod design pressure. The fuel rod design pressure is a function of thermomechanical performance requirements of the fuel rod based on the end-use environment. The oxygen content in the weld box 16 is checked with a conventional oxygen sensor (not shown) to ensure that it is low enough such as below 10–50 ppm to prevent discoloration or corrosion in the metal.

After pressurization, the end plug ram 34 is further extended to a second position to seat the end plug 38 into the fuel rod 22. In this position, the interior of the fuel rod 22 is sealed from the exterior by virtue of the tight friction fit between the end plug and the fuel rod, and the interior pressure is maintained. In one arrangement, the weld box 16 is then overpressurized with helium to prevent weld blow out from internal heating of the helium gas during the welding process. That is, heat at the weld joint tends to increase the pressure inside the fuel rod, and when the pressure inside the fuel rod exceeds the pressure inside the weld box, the weld in progress may be blown out by the excess pressure.

In an alternative preferred arrangement, the pressure in the weld box 16 is continuously changed during welding in accordance with the pressure inside the fuel rod 22, which pressure is mapped beforehand based on experimental data. That is, the pressure inside the fuel rod is determined by experimentation at intervals of, for example, 0.1 second, during the welding process, and a pressure vs. time table is stored for access during the laser operation.

The ram brake 32 is engaged to prevent the ram 34 from being pushed out of the weld box by hyperbaric pressure and to prevent the plenum spring from pushing the end plug out of the fuel rod. The air pressure in the ram cylinder is relieved to prevent the ram from collapsing the weld by applying pressure to the weld joint during welding.

An image processor 48 is a component of the controller 20 and includes a video frame grabber 50 coupled with a video camera 52 focused in the weld box 16. A laser window glass 54 serves as a camera window into the weld box 16, which is illuminated by a ring light 56. When the ring light 56 is energized, the image processor including the video camera 52 and frame grabber 50 captures an image of the end plug/fuel rod joint. The image processor 48 finds the location of the weld joint by processing the captured image in a known manner. This location is used to provide commands to a laser positioning system 60 to position the laser beam on the weld joint.

The laser positioning system 60 includes motor and slide assemblies including an X-axis motor and slide 62, a Y-axis motor and slide 64, and a Z-axis motor and slide 66 for respectively positioning the laser in X, Y and Z directions. The assemblies may be formed with any suitable structure such as with driven ball screws or the like, and the details thereof will not be further described.

The components of the laser assembly 18 that generate the laser beam are well known and include a laser source 67 coupled with a fiber optic 68 including an optical assembly to focus the laser into the weld box 16. In positioning the laser beam, the laser assembly 18 is positioned offset longitudinally along the weld joint to prevent reflections back up into the output housing and onto the fiber optic damaging the fiber.

Once the laser assembly is properly positioned, rotation of the fuel rod 22 by the fuel rod collet 28 is initiated, and helium flow through the laser window nozzle 46 is initiated and stabilized to maintain overpressure and sufficient velocity. As noted above, as the weld joint is heated, the pressure inside the fuel rod tends to increase. The helium flow through the laser window nozzle 46 continuously increases the pressure in the weld box to compensate for increased pressure within the fuel rod. Helium flow velocity is maintained above about 60 feet per second to prevent soot contamination of the laser window glass 54. Soot contamination on the laser window glass will cause the window to crack after one or two welds by diffusing the laser beam as it passes through the window, thereby heating up the glass. The high axial flow of gas also serves to flush metal vapor out of the beam fast enough to reduce plasma formation.

The laser assembly 18 is then energized, and the laser beam is coupled into the fiber optic 68. The fiber optic 68 is connected to the laser output housing, which focuses the beam onto the weld joint. The beam passes into the weld box 16 through the laser window glass 54. The laser window glass 54 is preferably anti-reflection coated to minimize reflection of the laser beam wavelengths. The output housing is located outside the weld box 16 to avoid contamination during the welding process.

Laser beam output power (watts) is recorded from the output housing photo diode 72 for each weld to verify that enough power has been coupled to the part to achieve the radial penetration required by design. Soot evolved from the welding process is evacuated out of the weld box 16 by an evacuation port 76 located behind the fuel rod 22. The position of the evacuation port 76 is critical to achieving a clean welding process by virtue of its proximity to the weld. The welding process is then complete.

After completion of the welding process, the weld is inspected to ensure the radial consumption of the joint.

By virtue of the structure and method according to the present invention, the final weld (upper end plug) for a fuel rod can be achieved in a single-step operation without the use of a seal hole to pressurize the fuel weld. By flowing helium through the laser window nozzle during welding, an optimized overpressure condition in the weld box is maintained, and soot contamination of the laser window glass is prevented. In addition, the high axial flow of gas flushes metal vapor out of the beam fast enough to reduce plasma formation. The result is an apparatus and method to perform laser seam welding of a fuel rod at hyperbaric pressure in a one-step operation without need for a seal weld. The process also eliminates the need for inspection of the upper end plug prior to use to ensure that the seal hole is open and also eliminates the need for radiographic or ultrasonic inspection of the seal weld joint. Welding with a laser also eliminates the potential in-reactor corrosion failure caused by potential TIG welding electrode contamination of the weld pool.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A high pressure laser welding method comprising:
   (a) securing an article to be welded inside a weld box;
   (b) pressurizing the weld box;
   (c) directing a laser toward the article to be welded along a laser axis;
   (d) flowing gas along the laser axis at a predetermined axial flow rate, and
   (e) varying the pressure in the weld box during application of the laser.

2. A method according to claim 1, wherein step (d) is practiced by flowing gas at an axial flow rate that reduces metal vapor plasma formation and prevents soot generated at the weld joint from accumulating on a laser window of the weld box.

3. A laser welding apparatus for welding articles together, the apparatus comprising:

an article positioning assembly that supports and positions the articles to be welded together;

a sealable weld box cooperating with said article positioning assembly;

a pressurized gas source communicating with said weld box;

a laser assembly that generates a welding laser directed into said weld box; and a controller operatively coupled with said article positioning assembly, said pressurized gas source and said laser assembly, said controller controlling a position of the articles to be welded together, a pressure in the weld box including during application of the laser, and operation of the laser in accordance with predetermined parameters.

4. A laser welding apparatus according to claim 3 wherein said controller comprises an image processor having a video frame grabber coupled with a video camera focussed in said weld box.

5. A laser welding apparatus according to claim 4 further comprising a laser positioning system communicating with said controller, said controller controlling a position of said laser assembly in accordance with a signal from said image processor, wherein said laser assembly is positioned offset longitudinally along the weld joint to prevent laser reflections.

6. A laser welding apparatus according to claim 3, wherein the articles to be welded together comprise a fuel rod for a nuclear reactor fuel bundle and an end plug, said article positioning assembly comprising:

a fuel rod collet supporting said fuel rod and controlling a position of said fuel rod in said weld box; and an end plug supporting assembly including an end plug adapter supporting said end plug and an end plug ram controlling a position of said end plug adapter.

7. A laser welding apparatus according to claim 6, wherein said article positioning assembly further comprises a retractable fuel rod stop disposed in said weld box, said retractable fuel rod stop in an extended position receiving an end of said fuel rod.

8. A laser welding apparatus according to claim 7, wherein said article positioning assembly further comprises a fuel rod inflating rod seal that seals the fuel rod outside diameter.

9. A laser welding apparatus according to claim 8, wherein said weld box comprises a fuel rod opening for receiving said fuel rod inflating rod seal and said fuel rod and an end plug opening for receiving said end plug adapter and said end plug, said fuel rod opening being sealed when said fuel rod inflating rod seal and said fuel rod are received therein, and said end plug opening being sealed when said end plug adapter and said end plug are received therein.

10. A laser welding apparatus according to claim 6, wherein said end plug supporting assembly further comprises a ram brake coupled with said end plug ram and said end plug adapter, said ram brake locking the position of said end plug adapter during welding.

11. A laser welding apparatus according to claim 6, wherein said fuel rod collet is rotatable for rotating said fuel rod during welding, said controller controlling the rotation of said fuel rod.

12. A laser welding apparatus according to claim 3, further comprising a laser window nozzle secured to said weld box and coupled with said pressurized gas source.

13. A laser welding apparatus according to claim 12, wherein said laser window nozzle is anti-reflection coated.

14. A laser welding apparatus according to claim 3, wherein said weld box comprises an evacuation port that enables soot generated during welding to be evacuated from said weld box.

15. A method of welding an end plug to a fuel rod for a nuclear reactor fuel bundle, the method comprising:

(a) supporting the fuel rod and the end plug in a weld box;

(b) pressurizing the weld box and the interior of the fuel rod to a first pressure;

(c) directing a laser toward the fuel rod and the end plug for welding along a laser axis;

(d) flowing gas along the laser axis at a predetermined axial flow rate; and (e) varying the pressure in the weld box during application of the laser.

16. A method according to claim 15, further comprising, after step (b), the steps of inserting the end plug into the fuel rod to seal the fuel rod, and overpressurizing the weld box to a second pressure such that the weld box pressure is higher than the fuel rod interior pressure.

17. A method according to claim 15, further comprising, after step (b), the steps of inserting the end plug into the fuel rod to seal the fuel rod, and controlling a pressure in the weld box in accordance with a pressure in the fuel rod.

18. A method according to claim 17, wherein the pressure in the fuel rod during welding is predetermined by experimentation and stored in a table.

19. A method according to claim 15, further comprising, prior to step (c), the step of capturing an image of a joint between the fuel rod and the end plug with an image processor and positioning the laser in accordance with a signal from the image processor.

20. A method according to claim 15, further comprising, prior to step (c), the step of rotating the fuel rod.

21. A method according to claim 15, further comprising evacuating soot evolved from the welding process out of the weld box via an evacuation port.

* * * * *